United States Patent

Nakashima et al.

Patent Number: 5,308,044
Date of Patent: May 3, 1994

[54] BORON NITRIDE CERAMICS AND MOLTEN METAL CONTAINER PROVIDED WITH MEMBERS MADE OF THE SAME CERAMICS

[75] Inventors: Masazumi Nakashima; Mitsunori Kusumoto; Sumihiko Kurita; Hiroshi Nakamura; Katsumi Ura; Akira Murata, all of Saga, Japan

[73] Assignee: Kabushiki Kaisha Kouransha, Saga, Japan

[21] Appl. No.: 747,449

[22] PCT Filed: May 12, 1988

[86] PCT No.: PCT/JP88/00453

§ 371 Date: Jan. 6, 1989

§ 102(e) Date: Jan. 6, 1989

[87] PCT Pub. No.: WO88/08831

PCT Pub. Date: Nov. 17, 1988

Related U.S. Application Data

[63] Continuation of Ser. No. 340,726, Jan. 6, 1989, abandoned.

[30] Foreign Application Priority Data

May 12, 1987 [JP] Japan ............... 62-116627
Jul. 23, 1987 [JP] Japan ............... 62-113676
Dec. 21, 1987 [JP] Japan ............... 62-325007

[51] Int. Cl.$^5$ ............................... C21D 11/00
[52] U.S. Cl. ..................... 266/88; 266/275; 501/96; 501/98; 374/139; 136/234
[58] Field of Search ......... 501/96, 97, 98; 333/28, 333/30; 374/26, 139; 136/234; 266/80, 88, 166; 206/530; 164/394; 165/9.1

[56] References Cited

U.S. PATENT DOCUMENTS

| | | | |
|---|---|---|---|
| 3,084,060 | 4/1963 | Baer et al. | 501/96 |
| 3,544,486 | 12/1970 | Passmore | 501/96 |
| 3,833,389 | 9/1974 | Kaneya et al. | 501/96 |
| 3,854,967 | 12/1974 | Reinmuth | 501/98 |
| 3,930,875 | 1/1976 | Ochiai et al. | 501/98 |
| 4,358,630 | 11/1982 | Falk | 136/234 |
| 4,377,347 | 3/1983 | Hanmyo et al. | 136/234 |
| 4,430,518 | 2/1984 | Nakajima et al. | 136/234 |
| 4,590,034 | 5/1986 | Hirono et al. | 423/298 |
| 4,642,298 | 2/1987 | Kuramoto et al. | 501/96 |
| 4,666,873 | 5/1987 | Morris, Jr. et al. | 501/96 |
| 4,749,416 | 6/1986 | Greenspan | 136/234 |
| 4,749,556 | 6/1988 | Parrish et al. | 423/291 |
| 4,762,729 | 8/1988 | Hirano et al. | 427/255.3 |
| 4,796,671 | 1/1989 | Furushima et al. | 501/97 |
| 4,900,526 | 2/1990 | Matsuda et al. | 501/96 |

FOREIGN PATENT DOCUMENTS

| | | | |
|---|---|---|---|
| 0396448 | 11/1990 | European Pat. Off. | 501/96 |
| 6164075 | 12/1981 | Japan . | |
| 1031360 | 2/1986 | Japan . | |
| 0640986 | 1/1979 | U.S.S.R. . | |

OTHER PUBLICATIONS

Chemical Abstracts, vol. 106, No. 4, Jan. 26, 1987, abstract No. 22283d, Columbus, Ohio, US; & JP-A-61 117 107 (Toshiba Tungaloy Co., Ltd) Apr. 6, 1986 *Abstract*.

*Primary Examiner*—Karl Group
*Assistant Examiner*—Paul Marcantoni
*Attorney, Agent, or Firm*—Nikaido, Marmelstein, Murray & Oram

[57] ABSTRACT

The present invention relates to ceramics having excellent fusing damage resistivity against melt of metal or other inorganic materials. If a member formed of BN ceramics in the prior art comes into contact with melt of metal, glass or the like, the member would be readily fused and damaged at its contact portion. Hence, if AlN in the range of $1 \leq AlN < 50$ weight % is added to BN ceramics containing 50 weight % or more of BN component, the fusing damage resistivity is greatly improved. Furthermore, $Y_2O_3$ whose weight proportion relative to AlN content is 1.0–10.0%, is added, strength of the BN ceramics is greatly improved. A protective cap for a thermocouple formed of the ceramics according to the present invention is excellent in durability against molten metal, and so, continuous temperature measurement for molten metal is possible.

4 Claims, 2 Drawing Sheets

BORON NITRIDE CERAMICS AND MOLTEN METAL CONTAINER PROVIDED WITH MEMBERS MADE OF THE SAME CERAMICS

This application is a continuation of application Ser. No. 340,726 filed Jan. 6, 1989 now abandoned.

FIELD OF THE TECHNOLOGY

The present invention relates to boron nitride (BN) ceramics having excellent resistance against fusing damages due to molten metal or other inorganic material and applications of the same ceramics.

TECHNICAL BACKGROUND

It has been known that BN ceramics are materials having very excellent antiwetting properties against melts of metal, glass and the like. Though BN ceramics having excellent antiwetting properties must be commonly used as materials for a furnace, in practice there are a number of reasons for preventing their use. A first reason is because when a member formed of the heretofore known BN ceramics comes into contact with melts of metal, glass and the like, it would be readily damaged by fusing. A second reason is because a member produced by sintering the heretofore known ceramics at the atmospheric pressure is quite indurable in use because of too low strength, hence it is a common practice to manufacture a BN ceramics member through a hot-press, and its manufacturing cost becomes high.

On the other hand, in order to continuously measure a temperature of molten metal within a molten metal container, it is a common practice to rely upon a thermocouple immersed in the molten metal. The thermocouple is inserted into a protective tube and it is put into the molten metal jointly with the protective tube. However, in connection to the use of the protective tube, there are the following problems:

① Since the protective tube in the prior art put in molten metal at a high temperature such as that of molten steel is liable to be eroded, continuous temperature measurement is difficult.

② In the conventional case, a protective tube is put into molten metal from its surface, and is held immovable by a holding member. According to this procedure in the prior art, the length of a protective tube becomes large, and its wall thickness must be made sufficiently large so that the protective tube may not be broken by flow of the molten metal. Consequently, there is a shortcoming that the protective tube becomes extremely expensive. In addition, a mechanism for holding and fixing the protective tube is complicated and handling thereof is intricate.

DISCLOSURE OF THE INVENTION

A first object of the present invention is to provide novel BN ceramics that are excellent in fusing damage resistivity against melts of metal, glass and the like and that have extremely high strength even when formed as a normal-pressure sintered article.

A second object of the present invention is to provide a molten metal container, in which a mechanism for putting a protective tube into molten metal from its surface and holding it as is the case with the prior art container, is made unnecessary by employing a protective cap that enables continuous measurement of the temperature of molten metal by means of a thermocouple and integrally assembling a temperature measuring function in a container wall.

The aforementioned first object can be achieved by providing BN ceramics containing 50 weight % or more of BN and 1 weight % or more and less than 50 weight % of AlN. According to results of tests conducted by the inventors of this invention, if AlN is contained in the range of $1 \leq AlN < 50$ weight % in ceramics containing 50 weight % or more of BN, fusing damage resistivity of the aforementioned ceramics against melts of metal, glass and the like, in remarkably improved. If $Y_2O_3$ is added to these BN ceramics in the range of 1.0–10.0 weight % relative to AlN, strength of the ceramics is greatly improved. Moreover, if at least a part of starting material powder of the BN component contained in the BN ceramics is prepared as amorphous BN powder or powder of material which produces amorphous BN in the course of sintering, the aforementioned effect of improving strength would reveal itself remarkably.

The above-mentioned second object can be achieved by providing a molten metal container, in which a protective cap formed of BN ceramics containing 50 weight % or more of BN and 1 weight % or more and less than 50 weight % of AlN is employed, and a refractory block having an outlet side opening (opening on the side held in contact with molten metal) of a through-hole for allowing a thermocouple to extend therethrough sealingly closed by that protective cap, is replaceably fitted in the wall of the container.

The BN content in the ceramics according to the present invention is 50 weight % or more. This is because if the BN content is chosen to be less than 50 weight %, the content of the other ceramics exceeds 50 weight % and their properties predominate, while the properties of BN are diluted and there occur inconveniences, for instance, such that the ceramics become liable to crack as a result of thermal impacts.

This also implies that the upper limit value of the AlN content should be set less than 50 weight %. The reason why the lower limit value of the AlN content is set at 1 weight % is because at a content of less than 1 weight %, with respect to the fusing damage resistivity against melts of metal, glass and the like a sufficient effect cannot be revealed. It is to be noted that as raw material powder for AlN, AlN powder or Al powder that is converted to AlN in the course of sintering, is used. The reason why the amount of addition of $Y_2O_3$ to the BN ceramics is defined as 1.0–10.0% in weight proportion with respect to AlN, is because at less than 1.0% the strength improving effect is small, and if the amount exceeds 10.0%, degradation of strength would result.

When as at least a part or whole of the starting material powder for the BN component contained in the ceramics according to the present invention, is amorphous BN powder or powder of materials that is converted to amorphous BN in the course of sintering, even by normalpressure sintering, ceramics having high strength can be obtained. As the material that can be converted to amorphous BN in the course of sintering, for instance, boron (B) can be exemplified. Amorphous BN or powder that can form amorphous BN should be preferably contained in least at 20 weight % or more of the whole starting materials.

It is to be noted that while the ceramics according to the present invention include BN and AlN as essential components, other oxides, nitrides, carbides, silicides, borides, etc. could be added appropriately within the ranges not interfering the defined contents of the essential components.

Preferred Embodiment 1

① BN ceramics samples No.1–No.5 of predetermined shape having different AlN contents (Table-1) were prepared by sintering under a normal pressure at a temperature of 1800° C. It is to be noted the K-value of the starting material BN is in the range of $0 \leq K \leq 0.9$.

When a peak area for index [hkl] corresponding to hexagonal crystalline BN in an X-ray diffraction pattern is represented by S[hkl], the K-value is defined as follows:

$$K = S[102]/(S[100] + S[101])$$

(Cu-Kα line by PW-1710 manufactured by PHILIPS)

TABLE 1

| | Composition Table of Used Ceramics | | |
| No. | BN (weight %) | Starting Materials of BN (weight proportion) | AlN (weight %) |
| --- | --- | --- | --- |
| 1 | 99 | Amorphous BN: 99 Crystalline BN: 0 | 1 |
| 2 | 95 | Amorphous BN: 95 Crystalline BN: 0 | 5 |
| 3 | 90 | Amorphous BN: 45 Crystalline BN: 45 | 10 |
| 4 | 70 | Amorphous BN: 35 Crystalline BN: 35 | 30 |
| 5 | 55 | Amorphous BN: 55 Crystalline BN: 0 | 45 |

② Samples No.1–No.5 were put in molten stainless steel (JIS SUS304 material) at a temperature of 1600° C.±20° C. so that their top portions may project above the surface of the molten metal, and an amount of fusing damage at the meniscus portion was measured. The results are shown in FIG. 1.

Figure 1:
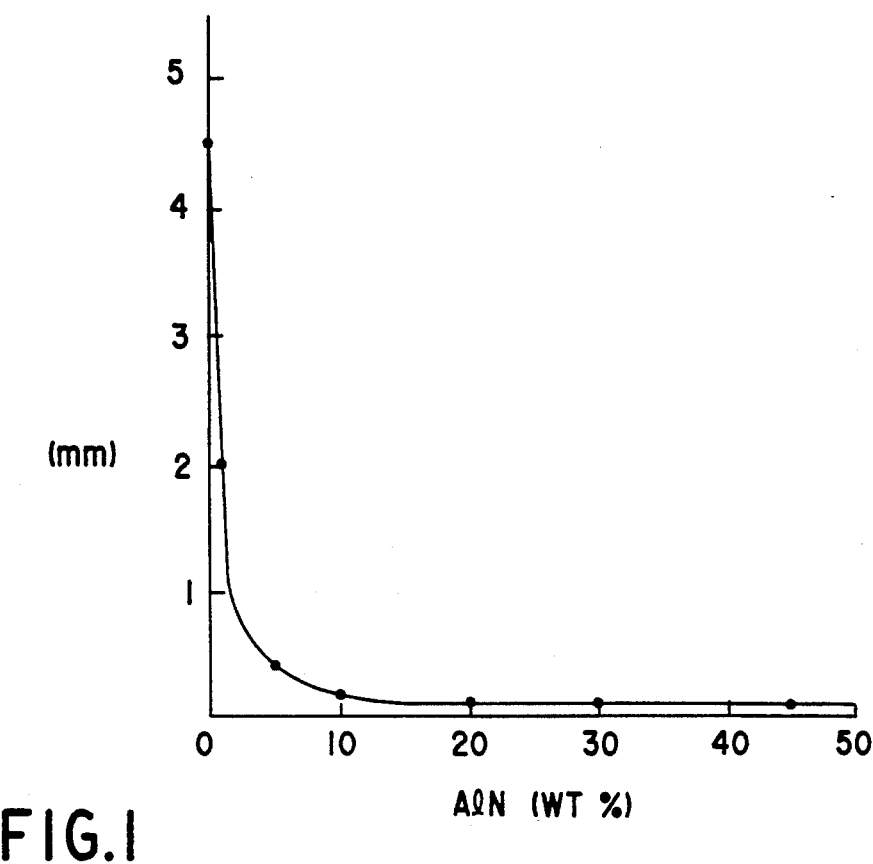
FIG. 1 is a diagram showing the relation between an AlN content in BN ceramics and an amount of fusing damage.

③ According to FIG. 1, it is seen that if the AlN content becomes 1 weight % or more, the amount of fusing damage of the samples decreses abruptly.

Preferred Embodiment 2

① BN ceramics samples No.6 –No. 10 of predetermined shape having different Y₂O₃ contents (Table-2) were prepared by sintering under a normal pressure at a temperature of 1800° C. It is to be noted that the K-value of the starting material BN is in the range of $0 \leq K \leq 0.6$.

When a peak area for index [hkl] corresponding to hexagonal crystalline BN in an X-ray diffraction pattern is represented by S[hkl], the K-value is defined as follows:

$$K = S[102]/(S[100] + S[101])$$

(Cu-Kα line by PW-1710 manufactured by PHILIPS)

TABLE 2

| | Composition Table of Used Ceramics | | |
| No. | BN (weight proportion) | Starting Material of BN | AlN (weight proportion) | Y₂O₃ weight proportion; parenthesized numeral representing weight proportion relative to AlM |
| --- | --- | --- | --- | --- |
| 6 | 70 | Amorphous BN | 30 | 0 (0%) |
| 7 | 70 | Amorphous BN | 30 | 0.3 (1.0%) |
| 8 | 70 | Amorphous BN | 30 | 0.9 (3.0%) |
| 9 | 70 | Amorphous BN | 30 | 3.0 (10.0%) |
| 10 | 70 | Amorphous BN | 30 | 4.8 (16.0%) |

② Bending strength of samples No.6–No. 10 was inventigated. The results are shown in Table-3.

TABLE 3

| | Test Results |
| No. | Bending strength (kg/mm²) |
| --- | --- |
| 6 | 5 |
| 7 | 8 |
| 8 | 9 |
| 9 | 9 |
| 10 | 3 |

③ From the test results shown in Table-3, it is seen that the bending strength of the BN ceramics is greatly improved at a weight proportion of Y₂O₃ relative to AlN in the range of 1.0–10.0%.

Preferred Embodiment 3

Figure 2:
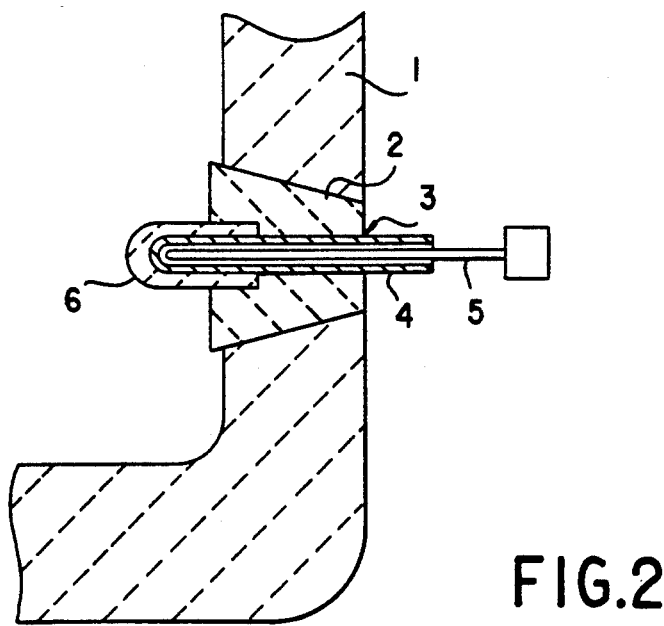
FIG. 2 is a cross-section view showing a part of molten metal container employing a protective cap of a thermocouple for measuring a molten metal temperature, which cap is made of BN ceramics having the composition according to the present invention.

A part of a molten metal container making use of a protective cap of a thermocouple for measuring a molten metal, which cap is made of BN ceramics having the composition according to the present invention, is shown in FIG. 2. Reference numeral 1 designates a part of a wall close to the bottom of the molten metal container. A refractory block 2 fitted in the wall 1 is a frusto-conical body having a through-hole 3 at its central portion, and it is formed of, for example, zirconia refractories (Z,O₂·SiO₂ or the like). The refractory block 2 mounted with its end surface having a larger diameter directed to the inside of the container would be pressed against the wall under a pressure of molten metal when molten metal has been poured into the container, and the fitting relationship with respect to the wall 1 would become more tight.

An alumina protective tube 4 for accommodating a thermcouple 5 is inserted into the through-hole 3 of the refractory block 2 so as to penetrate therethrough, and a protective cap 6 for blocking the outlet side opening (the opening on the side held in contact with the molten metal) of the through-hole 3 and covering the tip end portion of the protective tube 4, is mounted. This protective cap is formed of BN ceramics consisting of, for example, 70 weight % of BN, 30 weight % of AlN and 0.9 weight % of Y₂O₃ (weight proportion relative to AlN being 3%). In addition, if a gap clearance tends to be produced at the fitting portion of the protective cap 6 with respect to the refractory block 2, castable refractories can be used as sealing material. The protective tube 4 and the protective cap 6 are held in tight contact with each other, especially at their tip end portions, the tip end of the thermocouple 5 is held in contact with the inner surface of the protective tube 4, and heat of the molten metal charged in the container is transmitted through the protective cap 6 and the protective tube 4 to the thermocouple 5.

The protective cap 6 formed of the aforementioned BN ceramics can withstand continuous temperature measurement for about 12 hours even against molten steel.

In the structure for assembling the thermocouple 5 in the wall 1 as shown in FIG. 2, the protective cap 6 to be used in place of the elongated protective tube in the prior art is sufficiently short in length, and so it is economically advantageous. In addition, a complicated mechanism (the mechanism used in the prior art) for holding the protective cap 6 is not necessitated, work required for temperature measurement is extremely simple, and hence saving of cost by reducing man hour of the work, can be contemplated.

If the protective cap 6 has been consumed and has become unable to withstand the use as a result of continuous use, it is only necessary to extract the refractory block 2 from the wall 1 under an empty condition of the container and to replace new one. Thus, it is possible to carry out the recovery work within a short period of time.

In addition, besides molten metal containers not having a melting function such as a ladle, a tandish, etc., with respect to containers having a melting function a similar wall structure for continuous temperature measurement can be employed.

Preferred Embodiment 4

Figure 3:
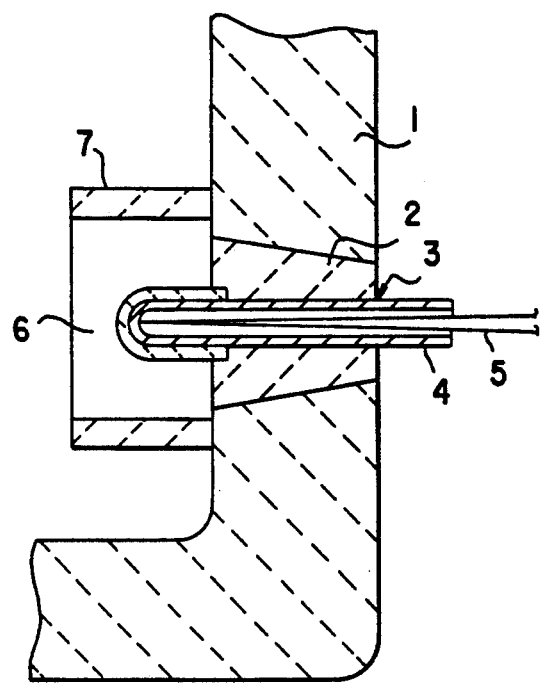
FIG. 3 is a similar view showing a modification to the structure shown in FIG. 2.

FIG. 3 shows the state where in addition to the structure shown in the section of Preferred Embodiment 3, a dam 7 is employed. The dam 7 is a cylindrical body, which is fixed to the wall 1 and which surrounds the protective cap 6. When molten metal is poured into the container, if falling molten metal should directly strike against the protective cap 6, then there is a fear that the protective cap 6 may be broken, and so, the dam 7 is used for the purpose of protecting the protective cap 6 from collision with poured molten metal. In addition, the dam 7 can achieve the functions and effects of protecting the protective cap 6 from flow of molten metal and improving fusing damage resistivity of the protective cap 6. It is to be noted that the shape of the dam 7 need not be always cylindrical, but it is only necessary to have such shape that can protect the protective cap 6 from impact of poured molten metal or from flowing molten metal.

Preferred Embodiment 5

Figure 4:
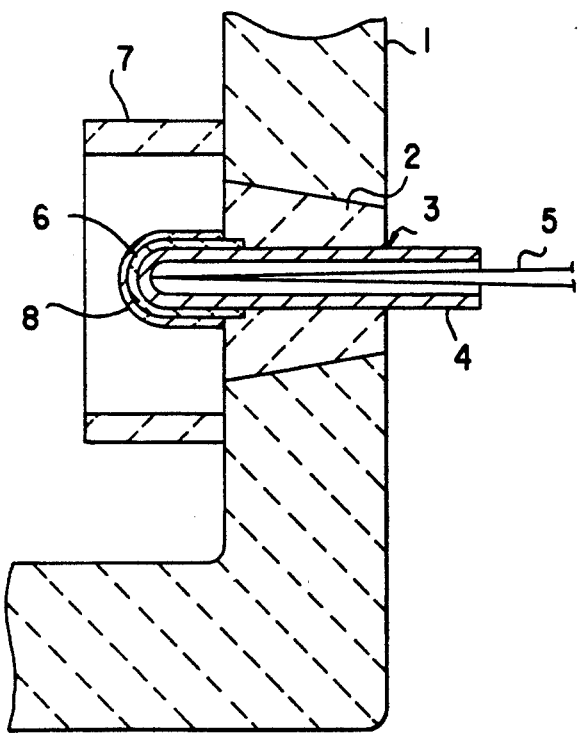
FIG. 4 is a similar view showing a modification to the structure shown in FIG. 3.

FIG. 4 shows an example in which in addition to the structure shown in the section of Preferred Embodiment 4, protecting means for the protective cap 6 has been employed. The outer surface of the protective cap 6 is covered by a glass coating 8. During the period when molten metal is being poured into the container before the protective cap 6 has sunk in the molten metal, the protective cap 6 is exposed to radiant heat of the molten metal. While the naked protective cap 6 therefore has a tendency of being oxidized in the case where the molten metal temperature is high, the oxidization reaction is obstructed because the surface of the protective cap 6 is protected by the glass coating, and a durability is improved. This glass coating 8 does not become a bar against temperature measurement.

It is to be noted that in the above-described respective preferred embodiments, it is possible to omit the protective tube 4.

Industrial Availability

The BN ceramics according to the present invention is excellent in fusing damage resistivity, even a normal-pressure sintered body has high strength, and moreover, the manufacturing cost is low, so that they are available as members for use in various kinds of furnaces, which members come into contact with melts of metal, glass and the like and have excellent durability.

We claim:

1. A container structure means adapted to hold molten metal therein comprising;
   a container body comprising at least one wall and a bottom, which is adapted to receive and hold said molten metal, and which has at least one hole through at least one wall thereof;
   a refractory block replaceably fitted in and through said hole in said wall in a hole-closing condition;
   a passageway through said refractory block adapted to allow communication therethrough, to said molten metal;
   a protective end cap on the side of said refractory block directed toward said metal substantially covering and sealing said passageway from contact with said metal, which cap is closed at the end thereof directed toward said metal, and which cap has a hollow interior communicating with said passageway; and
   thermocouple means disposed in said passageway and in the hollow portion of said end cap; wherein said protective cap consists essentially of a ceramic material having a high bending strength, which consists essentially of: at least 50 percent by weight boron nitride; at least 1 percent, but less than 50 percent, by weight aluminum nitride; and 1 to 10 weight percent, sufficient to increase the bending strength of said ceramic to at least about 5 kg/mm$^2$ of yttrium oxide, based on the weight of aluminum nitride;
   said protective cap having been made by sintering at normal pressures, a composition comprising at least 20 weight percent of at least one of amorphous boron nitride and boron.

2. A container structure means as claimed in claim 1 additionally comprising a protective tube, comprising aluming, disposed in said passageway and the hollow portion of said end cap, wherein said thermocouple means is disposed within said protective tube.

3. A container structure means as claimed in claim 1 additionally comprising a protective coating, comprising glass, disposed on the surface of said protective end cap directed toward said metal.

4. A container structure means as claimed in claim 1 additionally comprising a substantially tubular shaped dam disposed on the wall of said container body directed toward said metal and disposed around said protective end cap in a configuration adapted to shield said protective end cap against impact stresses.

* * * * *